3,361,690
POLYESTER MOLDING COMPOSITION CONTAINING AQUEOUS-ALKALI-EXTRACTED-DOUGLAS FIR BARK FIBER AS A REINFORCING AGENT
Arthur S. Gregory, Tacoma, and Keith D. Gehr and Thomas R. Frost, Longview, Wash., assignors to Weyerhaeuser Company, Tacoma, Wash., a corporation of Washington
No Drawing. Continuation of abandoned application Ser. No. 243,630, Dec. 10, 1962. This application Sept. 8, 1966, Ser. No. 578,103
5 Claims. (Cl. 260—17.4)

ABSTRACT OF THE DISCLOSURE

A thermosetting composition consisting essentially of unsaturated polyester base resin, an unsaturated crosslinking monomer therefor, a reinforcing agent comprising an aqueous alkali extracted Douglas fir bark fiber and supplemental filler.

---

This application is a continuation of S.N. 243,630 filed Dec. 10, 1962, and now abandoned.

This invention relates to plastics. It pertains particularly to resinous mixtures useful as molding compositions and comprising a polyester resin and tree bark fiber.

Polyester resinous compositions used for molding and containing conventional reinforcing materials such as glass or sisal have several disadvantages.

Thus when glass fiber is used as the reinforcing material, compounding time must be held to a minimum to avoid excessive fiber breakage and resulting loss of strength. However, curtailing the compounding time results in unequal dispersion of the fiber, and hence in non-uniform molded product properties. Moreover, when medium or high glass fiber content is used, the finished molded article will often exhibit rough surfaces caused by flow patterns of the resin-glass fiber mixture formed during molding.

Similarly, the inclusion of sisal fiber in polyester resin molding compositions creates a deflashing problem because of its toughness and length. As a result, it is not unusual for a one-man press to demand a three-man deflashing crew. Where medium or high glass fiber content is used, a similar deflashing problem exists.

Further, when either glass fiber or sisal is used as a reinforcing material, a lowering of strength occurs at the weld and kiln lines of the molded article.

Still further, polyester resin compositions containing conventional reinforcing materials because of their soft and tacky properties are not suitable for application in automatic molding procedures.

Accordingly, it is the general object of the present invention to provide a polyester resinous composition particularly suitable for use as a molding compound and characterized by the following advantages:

(1) Non-critical mixing.
(2) Adaptability to automatic molding techniques in both compression and transfer molding equipment.
(3) Easy deflashing.
(4) Relative freedom from warping.
(5) Improved strength at weld and knit lines.
(6) Reduced specific gravity, resulting in increased unit production per pound of molding compound.
(7) Superior appearance and surface qualities including various colors.

It is the fundamental concept of the present invention that the foregoing objects and advantages may be achieved by including as a material in polyester resinous compositions the fiber content of the bark of trees. Such a fiber content is found in the barks of various coniferous tree species including redwood, cypress, juniper, the cedars and, particularly, the Douglas fir.

It is an object of this invention to provide a polyester resinous molding composition including as a reinforcing material coniferous bark fibers having a particle size so as to pass through a 28 mesh screen and be retained on a 200 mesh screen and having an average length to breadth ratio of 15:1.

The fiber content of the bark may be separated from the other bark components by either mechanical or chemical procedures. In a typical mechanical procedure, the bark is ground or milled to a suitable particle size and is then fractionated mechanically by screening, winnowing or otherwise to obtain the fiber fraction. Where the fiber is obtained from species such as redwood or cedar it is then necessary to reduce the fiber length by cutting or chopping.

A preferred bark fiber is that obtained from the Douglas fir which occur in the form of strong, hard, tough needles which generally are spindle shaped (generally cylindrical with tapering ends) and have a length averaging about 1 mm.

However, these Douglas fir bark fibers are so intimately commingled with the other bark components that a pure bark fiber fraction is more difficult to achieve by mechanical means of separation than is the case with other coniferous barks having fiber.

Furthermore, the non-fibrous components of Douglas fir bark contain a high percentage of complex acids and phenolic bodies which act to inhibit the cure of peroxide-catalyzed polyester resins used in the present invention.

Accordingly, when Douglas fir bark fibers are used it is preferred to employ a fiber fraction which has been treated or extracted with an aqueous alkaline treating agent. In preparing such a bark fiber fraction, the whole bark, or a previously separated fiber-containing fraction of whole bark, is reduced by grinding or milling to a particle size suitable for subsequent processing, i.e., to a particle size volume of ¼ inch cube or less.

The bark is subjected to a chemical treatment in which it is reacted with an aqueous alkaline treating agent broadly comprising a basic acting compound of an alkali metal or ammonium hydroxide. Caustic soda is a preferred treating agent although other alkaline agents such as caustic potash, sodium carbonate, sodium bicarbonate, borax and ammonium hydroxide also may be used.

The bark is treated with the alkaline material in either single or mutliple stages, either batchwise or continuously, with an alkali usage of from 5–25%, and at a consistency of the bark of from 5–40%. Appropriate amounts of water are used to produce these conditions. The treating time is variable, although in general a period of from 30–180 minutes is adequate at a temperature in the range of ambient to the boiling point.

The foregoing treatment serves several important functions. First, and most significantly for the present purpose, it provides a bark fiber fraction having an alkali soluble content of below 30%, preferably about 15%, by weight, dry basis, whereas the whole bark or fiber-containing fraction thereof may have an alkali soluble content of as much as 60%. Furthermore, this result is accompanied by dissolution of a substantial proportion of the nonfibrous bark substance from the individual fibers, leaving them as a solid residue.

After the chemical treatment has been completed, the resulting alkaline slurry is withdrawn from the reactor and separated by screening, or otherwise, into an extract fraction and a residual bark fiber fraction. The latter may be washed with hot water or other solvent after which it is applicable directly after drying to predetermined moisture levels in the formulation of the herein described molding compositions.

However, for some molding compound applications, it may be desirable to dry the fiber product to a moisture content of less than 50% by weight and subject it to a screening to remove any wood splinters that may have adhered to the bark upon removal from the log. It may also be desirable, in some instances, to screen the bark fiber product to free it of any alkali-insoluble particles of parenchyma or cork cells remaining as dust. All of these are termed herein "extracted bark fiber."

Where mechanical means have been used to separate out and provide a fiber fraction from Douglas fir bark which is not sufficiently free of cure inhibiting non-fibrous bark components, the fraction nevertheless can be used by subjecting it first to a chemical treatment with an aqueous alkali treating agent which reacts sufficiently with the complex acids and phenolic bodies of the non-fibrous bark components to render them ineffective as inhibitors to the curing of the polyester resin. These fibers are termed herein "chemically treated fibers."

For use in the presently described compositions, the tree bark fiber preferably first is dried to a final moisture content of from 4–15% by weight, dry fiber basis. Most of this moisture is retained in the fibers and is not lost during the ensuing molding operation but is retained in the molded product. When introduced via the fiber, it has the advantageous effect of increasing the flowability of the composition in the mold. It also increases the impact strength of the molded product and increases the resistance of the molded product to crazing. However, if the moisture content of the fiber is much above 15% problems of blowing and blistering are encountered during molding.

The polyester resin which is used together with the tree bark fiber as an essential component of the herein described compositions broadly comprises the resinous product produced by the copolymerization of a polyester base resin and an unsaturated cross-linking monomer therefor. The polyester base resin is usually sold dissolved in the crosslinking monomer with a typical composition being 60–75% polyester and 40–25% monomer.

The polyester base resins are articles of commerce characterized as polymerizable, olefinically unsaturated, polyhydric alcohol-polycarboxylic acid polyesters. Such esters are produced by the copolymerization in known manner of a polyhydric alcohol, a saturated polycarboxylic acid and an unsaturated polycarboxylic acid.

Examples of polyhydric alcohols which may be employed as components of the polyester base resins are ethylene glycol, propylene glycol, the 1,2-, 1,3-, and 1,4-butane diols, the 1,2-, 1,3-, 1,4-, and 1,5-pentane diols, 1,6-hexane diol and the like. Ethylene glycol and propylene glycol are of particular interest for the present purpose.

Examples of saturated polycarboxylic acids which are useful as components of the presently described polyester base resins are those which are free of nonbenzenoid unsaturation, including the saturated aliphatic polycarboxylic acids such as malonic, succinic, glutaric, adipic, pimelic, suberic, azelaic, and sebacic, as well as the benzene dicarboxylic acids such as phthalic acid, benzoyl phthalic acid, isophthalic acid, terephthalic acid and the chlorinated phthalic acids such as tetrachlorophthalic acid. Whenever available, the anhydrides of these acids, or mixtures of these acids and their anhydrides may be employed. Of the foregoing group phthalic anhydride, isophthalic acid and terephthalic acid are particularly suitable for the present application.

Examples of unsaturated polycarboxylic acids which may be included as components of the herein described polyester base resin are the alpha ethylenically unsaturated alpha beta dicarboxylic acids such as maleic acid. Here again the anhydrides of the acids may be employed whenever they are available, either alone or in admixture with the free acids. Maleic anhydride and fumaric acid are particularly suitable.

The unsaturated cross-linking monomer which is employed together with the above described polyester base resin in producing the final cross-linked copolymer comprises broadly a copolymerizing vinyl derivative such as styrene, vinyl toluene, and diallyl phthalate. The side chain-substituted styrenes such as alpha methyl styrene, alpha ethyl styrene and the like also may be used. Still further, there may be employed the ring-substituted styrenes such as the ortho, meta and paraalkyl styrene, 2,4-dimethyl styrene, 2,5-diethyl styrene and the like. Of the foregoing, styrene, vinyl toluene and diallyl phthalate are preferred cross-linking monomers for the present purposes.

When an unsaturated polyester base resin and an unsaturated cross-linking monomer therefor are mixed in the desired proportions and heated, copolymerization by addition reaction takes place between the unsaturated linkages of the two components to form as the final product a cross-linked thermoset polymer. The most common method of triggering this copolymerization is by the use of catalysts or "initiators" which preferably are of the organic peroxide type.

Particularly suitable organic peroxides to be used for this purpose are benzoyl peroxide, and, where longer resin shelf life is required, tertiary butyl perbenzoate. Other examples of suitable organic peroxide catalysts are cumene hydroperoxide, methyl ethyl ketone peroxide, tertiary butyl peroxide, and the like.

These and other catalysts decompose upon heating into highly active free radicals that initiate the free radical reactions necessary for the copolymerization. They may be included in the molding compositions in relatively minor proportions, i.e. in proportions of from 0.01–3% by weight, based on the total weight of the composition.

In addition, to present premature reaction of the unsaturated polyester base resin, an inhibitor usually is included in the uncured resinous mixture. This usually is included in the polyester resin base at the time of manufacture. Occasionally, however, the compounder will add additional inhibitor during compounding to give other properties including additional stability and hence longer shelf life to the mixture.

The preferred inhibitor is hydroquinone, although other inhibitors may be used including ditertiary-butyl-hydroquinone, benzaldehyde, ascorbic acid, resorcinol, etc. These are used in small but effective proportions, i.e., in a proportion of from 0.01–0.5% by weight of the molding composition.

If desired, various supplementary mineral or organic fillers may be included in the compositions of the invention together with the tree bark fiber and polyester resin. There may be employed semi-reinforcing mineral fibers such as wollastonite, and particularly, asbestos. These impart to the mix better molding properties and increase the flexural and impact strength of the molded product.

Asbestos is a preferred semi-reinforcing mineral filler for use with the tree bark fiber. The tree bark fiber, in addition to supplying strength as a reinforcing fiber, because of low oil absorption properties, offsets the high resin demand normally accompanying the use of asbestos filler. Hence the two materials complement each other in their properties. Also, the asbestos filler reduces to a very high degree the shrinkage factor of the molded products and prevent the development of thermal strains in them.

Still other exemplary mineral or inorganic fillers which may be employed in the instant compositions are the kaolinite clays, calcium carbonate, talc, calcium sulfate, barytes, etc.

To develop particular properties in the molded products it is permissible to include in the molding compositions suitable proportions of such materials as glass fiber, sisal fiber, cotton flock and the like.

In addition to the various types of fillers outlined above, still other supplemental materials may be used to impart desired properties to the molding compositions and molded products.

For example, there may be included a minor proportion by weight of the total composiiton, of a suitable mold release compound such as stearic acid, zinc stearate, or lecithin.

Suitable organic solvents such as the lower aliphatic alcohols and ketones, particularly methyl-ethyl ketone, also may be included in small quantities to improve the degree of dispersion of the ingredients.

Where desirable, various pigments and dyes may be included in suitable amounts.

The foregoing materials may be used over a wide range of proportions, depending upon the identity of the components of the resinous mixtures and the properties it is desired to develop therein. In general, a sufficient amount of the unsturated cross-linking monomer is employed to react efficiently with the unsaturated polyester base resin. A sufficient proportion of the tree bark fiber and of the supplemental mineral or organic fillers is employed to provide the necessary bulk and product qualities and to conribute necessary strength to the molded product. The relative proportions of these three primary ingredients of the compositions are shown below, expressed in percent by weight of the total resinous composition:

|  | General | Preferred |
| --- | --- | --- |
| Catalyzed, unsaturated polyester base resin and unsaturated cross-linking monomer | 20–80 | 20–40 |
| Tree bark fiber | 10–60 | 15–35 |
| Supplemental filler | 0–70 | 35–45 |

The proportions of the secondary constituents of the compositions likewise are widely variable depending upon their identity and the properties to be imparted to the mixtures. Thus sufficient of the peroxide or other catalyst is employed to polymerize the resin at a reasonable rate. In a typical case, this amount is from 0.1 to 3% by weight, based on the total resinous composition.

Similarly, a sufficient amount of the hydroquinone or other inhibitor is added, either during manufacture of the base resin or during compounding, to stabilize the composiiton against premature gelation and to give it the desired shelf life. In a typical instance this amount is from 0.01 to 0.5% by weight, based on the total weight of the resinous mixture.

Sufficient mold release compound is used to insure clean and easy release of the molded article from the mold. In most instances this amount will vary from 0.1 to 3% by weight, based on the total weight of the mixture.

In cases where an organic solvent is employed to disperse the constituents, a quantity of from 0.01 to 2% by weight, based on the total weight of the mixture, usually is suitable.

A specific formulation adaptable for use with different types of polyester resin is as follows, the proportions being given in percent by weight of the total resinous composition:

| | |
| --- | --- |
| Polyester resin | 25–35 |
| Additional unsaturated cross-linking monomer | 0–5.0 |
| Coniferous tree bark fiber | 15–35 |
| Asbestos filler | 35–45 |
| Catalyst | 0.1–3 |
| Inhibitor | 0.01–0.5 |
| Mold release compound | 0.1–3 |
| Organic solvent | 0–2 |

The herein described resinous compositions may be mixed and compounded using any suitable technique which will secure uniform dispersion of the constituents throughout the mix.

In a typical procedure, the benzoyl peroxide or other catalyst first is added to additional cross-linking monomer, if used, and this solution is added to the polyester resin. Otherwise the catalyst can usually be added directly to the resin.

The hydroquinone or other inhibitor, if used, is dissolved in an appropriate quantity of methyl ethyl ketone or other organic solvent. This solution then is added directly to the polyester resin.

The tree bark fiber is placed in a mixer and blended with the catalyzed resin prepared as outlined above. The asbestos filler is added to the mixture and the mixing procedure continued until dispersion of the constituents is complete. The mixing time cycle in a typical case is but 3–4 minutes using a high shear mixer, but may require 20–45 minutes in a double arm kneader type mixer. This molding composition mixture then may be molded in matched metal dies at pressures of the order of 400–1000 p.s.i. and temperatures of the order of 250–350° F., using cure times of from 30–90 seconds or longer depending on section thickness. As noted above, the molded products are very easily deflashed and show a reduced tendency to warp during cooling.

The resinous compositions of the invention are illustrated further in the following examples:

*Example 1*

This example illustrates a typical procedure for preparing a mechanically separated tree bark friction for use in the compositions of the invention.

Douglas fir bark was milled in a hammermill provided with 7/16 inch screen and dried to a moisture content of about 15%. The ground bark material was placed on a double deck vibrating screen, the top screen of which was 14 mesh (Tyler Standard) and the bottom 88 mesh (Tyler Standard). The parenchyma powder fraction passed both screens. The fiber fraction was retained on the second screen.

The fiber fraction was passed to a ball mill to further disengage non-fibrous bark substances from the fiber and then screened on a vibrating screen to separate out a fiber fraction which passed through a 34 mesh screen and was retained on a 88 mesh screen (Tyler Standard). This fiber fraction was ground in a high speed hammermill having a 3/32 inch mesh opening screen and then passed through an air separator. The coarse fraction from the air separator was then screened and the fraction passing through an 80 mesh screen but retained on a 150 mesh screen (Tyler Standard) was used as the tree bark fiber in a polyester resin molding composition.

*Example 2*

This example illustrates a typical procedure for preparing a chemically treated bark fiber used in the resinous compositions of the invention.

Douglas fir bark was ground, ball milled, and screened as in Example 1. However, the fractions passing through the 88 mesh screens were combined and passed through the same sequence of steps of hammermilling, air separation and screening. To the fraction passing the 80 mesh screen and remaining on the 150 mesh screen (Tyler Standard) was added sufficient sodium hydroxide and water to enable the mixture to be stirred and to raise the pH of the mixture at equilibrium to 8.3. At such time the water was drained off and the fiber dried to a moisture content of 7%. This reaction with caustic was sufficient to render ineffective the inhibiting feature of the complex acids and phenolic bodies of the non-fibrous bark components which were present in greater proportion than in Example 1 because of the fine 88 mesh screen particle size of the base material.

Example 3

This example illustrates a typical procedure for preparing the extracted bark fiber used in the resinous compositions of the invention.

Douglas fir bark was reduced to particles in a hammermill have 3/16 inch screen. The ground bark was treated in a continuous countercurrent two-stage extraction system with the bark fed into the first stage and an aqueous caustic soda solution having a concentration of 50% by weight fed together with countercurrent wash liquor into the second stage. The temperature maintained in the extraction system was about 200° F. The pH values were 10 in the first stage and 13 in the second stage, while the consistencies were 8% and 7% respectively, and the dwell times were 60 minutes in each stage.

A caustic soda extract product of the bark was produced continuously from the first stage and a treated extracted bark fiber product was produced continuously from the second stage. The bark fiber product was passed over a vibrating screen separator onto a washing horizontal vacuum pan filter and then through a roll press. The pressed product then was dried to a moisture content of 7% by weight in a rotary drum drier, heated to 450° F. at the inlet.

It was suitable per se for use in the resinous molding compositions of the invention. However, as mentioned previously, where desirable, subsequent screenings can be made to insure complete removal of any wood splinters or dust particles.

Example 4

In a manner similar to the foregoing, alkali treated bark fiber from cedar was prepared. However, after obtaining the extracted fiber it was necessary to reduce the particle size in a rotary cutting mill and by screening to obtain the −80 +150 mesh size suitable for use in the molding compositions of this invention.

Example 5

In a manner similar to that of Example 1, redwood tree bark was mechanically treated and a fiber fraction separated which was then subjected to a cutting and screening process similar to that mentioned in Example 4 and a tree bark fraction −65 +200 mesh was obtained suitable for use in the resinous molding compounds of this invention.

Example 6

The above examples of coniferous tree bark fibers were compounded in a typical molding composition of the invention using a polyester resin. The compositions had the following formulation:

|  | Grams |
|---|---|
| Polyester resin [1] | 406 |
| Styrene monomer | 32.4 |
| Coniferous tree bark fiber | 432 |
| Asbestos filler | 600 |
| Benzoyl peroxide catalyst | 8.80 |
| Hydroquinone inhibitor | 0.22 |
| Zinc stearate mold release compound | 9.6 |
| Methyl ethyl ketone organic solvent | 1.10 |

[1] "Plaskon 9520": This is believed to be a condensation product of ethylene glycol, phthalic anhydride, and maleic acid dissolved in vinyl toluene.

Preparatory to formulating, the solid benzoyl peroxide catalyst granules were added to the styrene and allowed to soak for about 5 minutes. The hydroquinone inhibitor was dissolved in 5 times its weight of methyl ethyl ketone. This in turn was dissolved completely in the unsaturated polyester resin. The benzoyl peroxide-styrene slurry was then added to the inhibited resin base solution and the mixture stirred until solution of the benzoyl peroxide was complete.

Next, the dry constituents of the composition, i.e., the bark fiber, the asbestos and the zinc stearate, were placed in a high shear mixer and blended 30 seconds. The catalyzed resin solution was added, with the mixer running, over a 35–40 second period. Mixing was continued for a total of 3 minutes.

The completed premix was withdrawn from the mixer and molded into test panels in 60 seconds at 270° F. The test specimens then were subjected to standard tests with results as follows:

|  | Example |  |  |  |  |  |
|---|---|---|---|---|---|---|
|  | A [1] | 1 | 2 | 3 | 4 | 5 |
| Flexural Strength, p.s.i. | 7,000 | 8,430 | 7,770 | 9,670 | 7,820 | 7,360 |
| Flexural Modulus, p.s.i.×10⁻⁵ | 8.0 | 10.9 | 8.46 | 11.8 | 10.0 | 9.25 |
| Izod Impact, ft. lb/inch of notch | 2.0–215 | 0.57 | 0.72 | 0.75 | 0.80 | 0.50 |
| Dropped Ball Impact,[2] inches | 26–37 | 13–18 | 15–21 | 20–23 | 20–29 | 15–19 |
| Barcol Hardness | 37 | 43 | 30 | 35 | 35 | 32 |
| Cure Time, seconds | 40 | 23 | 25 | 22 | 24 | 23 |
| Flow,[3] inches | 11 5/16 | 9 13/16 | 10 12/16 | 10 14/16 | 8 19/16 | 7 15/16 |

[1] These are average properties of a typical 10% sisal-polyester resin molding composition.
[2] 41 grams of molding composition is molded into a disc 4 inches in diameter and 1/8" thick for 60 seconds at 270° F. and 800 p.s.i. A 1/2 pound ball impact head is dropped on the disc from heights increasing in increments of 1 inch. The first figure report is the height when a crack first appears, and the second figure is the height when failure occurs.
[3] A molding composition preform, 2 x 4 x 3/4", weighing 140 grams, is placed crosswise at the step end of a 6 x 12" die having a 1/8" step, 3 3/4" long at one end and is molded for 60 seconds at 270° F. and 655 p.s.i. The distance the compound moves down the die before curing is reported in inches.

Example 7

The procedure of Example 6 was followed, but using extracted Douglas fir fiber and different polyester resins in the following formulation:

|  | Percent by weight |
|---|---|
| Unsaturated polyester resin | 27.25 |
| Additional cross-linking monmer | 2.17 |
| Extracted bark fiber | 28.99 |
| Asbestos filler | 40.27 |
| Benzoyl peroxide catalyst | 0.59 |
| Hydroquinone inhibitor | 0.015 |
| Zinc stearate mold release compound | .64 |
| Methyl ethyl ketone organic solvent | .076 |

The first polyester base resin used in the above formulation was "Plaskon Pe-180." This is believed to be a condensation product of ethylene glycol, ortho-phthalic acid or anhydride and maleic and/or fumaric acid dissolved in vinyl toluene.

The second polyester base resin used in the above formulation was "Stypol 2214." This is believed to be a condensation product of ethylene glycol, sebacic acid and maleic acid dissolved in vinyl toluene.

The third polyester base resin used in the above formulation was "Reichhold DD-247." This is believed to be a condensation product of ethylene glycol, isophthalic and sebacic acid and maleic anhydride dissolved in styrene.

The mixed compositions were molded and the molded products subjected to standard tests with results as follows:

|  | "Plaskon Pe-180" | "Stypol 2214" | "Reichhold DD-247" |
|---|---|---|---|
| Flow, inches | 8 13/16 | 8 13/16 | 8 3/16 |
| Flexural Strength, p.s.i. | 9,200 | 8,200 | 10,800 |
| Izod Impact, ft. lb./in. of notch | .72 | .73 | .78 |
| Barcol Hardness | 34 | 26 | 26 |
| Dropped Ball Impact, inches | 21–23 | 19.22 | 23–27 |
| Flexural Modulus ×10⁻⁶ | 1.16 | 1.00 | 1.16 |

*Example 8*

This example illustrates the strength knit lines provided by the reinforcing bark fibers of this invention. Molding composition A and 3 of Example 6 each were molded into 6 x 12" sheets with half of the charge placed at each end of the die. Flexural strength test specimens were cut from the sound area on either side of the knit line and in the knit line. The results were as follows:

|  | A | 3 |
|---|---|---|
| Crosswise Flexural Strength, p.s.i. | 6,200 | 7,170 |
| Knit Line Flexural Strength, p.s.i. | 4,100 | 5,720 |
| Percent Reduction | 34 | 20 |

From the foregoing description and examples it is seen that the present invention by using the bark fiber of coniferous trees as a reinforcing fiber for polyester resin molding compositions produces molded articles of equivalent utility to those heretofore produced by the use of sisal without the disadvantages associated with such use. The particle size of −28+200 mesh for the bark fiber as compared to the ¼–½ inch length commonly used in chopped sisal, and the strong, hard, tough characteristics of these fibers all contribute to provide the advantages of easier deflashing, stronger knit lines, good flow and less tendency to warp compared to those polyester molding compositions previously known. The resistance of bark fibers to resin absorption permits a higher usage and a drier and firmer premix which is adaptable to transfer molding. Thus, usages of bark fiber can range from 10–60% with a preferred range being 15–35% resinous mixture whereas sisal is seldom used in amounts above 10% because of deleterious effects on flow and mixing.

Having thus described our invention in preferred embodiments, we claim as new and desire to protect by Letters Patent:

1. A thermosetting composition comprising a catalyzed, thermosetting, polymerizable, olefinically unsaturated, polyhydric alcohol-polycarboxylic acid polyester base resin; an unsaturated cross-linking monomer therefor; a reinforcing agent comprising an aqueous-alkali-extracted Douglas fir bark fiber having a residual aqueous-alkali-soluble content of not over 30% by weight, dry solids basis, and an inorganic supplemental filler, used in the following proportions:

|  | Percent by weight |
|---|---|
| Polyester base resin and cross-linking monomer | 20–80 |
| Douglas fir bark fiber | 10–60 |
| Supplemental filler | 2–70 |

2. A thermosetting composition comprising a catalyzed, thermosetting, polymerizable, olefinically unsaturated, polyhydric alcohol-polycarboxylic acid polyester base resin; an unsaturated cross-linking monomer therefor; a reinforcing agent comprising an aqueous-alkali-extracted Douglas fir bark bast fiber having a residual aqueous-alkali-soluble content of not over 30% by weight, dry solids basis and an inorganic supplemental filler, used in the following proportions:

|  | Percent by weight |
|---|---|
| Polyester base resin and cross-linking monomer | 20–40 |
| Douglas fir bark fiber | 15–35 |
| Supplemental filler | 35–45 |

3. The thermosetting composition of claim 2 wherein the Douglas fir bark fiber has a moisture content of from 4–15% by weight, dry bark fiber basis.

4. The thermosetting composition of claim 2 wherein the inorganic filler comprises an asbestos filler.

5. A thermosetting composition including aqueous-alkali-extracted Douglas fir bark bast fiber having a residual aqueous-alkali-soluble content of not over 30% by weight, dry solids basis, the composition including the following constituents employed in the indicated proportions:

|  | Percent by weight |
|---|---|
| Polymerizable, olefinically unsaturated polyhydric alcohol-polycarboxylic acid polyester resin | 25–35 |
| Additional cross-linking monomer | 0–5.0 |
| Douglas fir bark fiber | 15–35 |
| Asbestos filler | 35–45 |
| Peroxide catalyst | 0.1–3 |
| Inhibitor | 0.01–0.5 |
| Mold release compound | 0.1–3 |
| Organic solvent | 0–2 |

References Cited

UNITED STATES PATENTS

| 2,697,081 | 12/1954 | Heritage | 260—17.2 |
| 2,852,487 | 9/1958 | Maker | 260—9 |
| 2,890,231 | 6/1959 | Heritage et al. | 260—412.5 |
| 2,985,615 | 5/1961 | Tunteler et al. | 260—9 |
| 3,023,136 | 2/1962 | Himmelheber | 260—17.3 |

WILLIAM H. SHORT, *Primary Examiner.*

JAMES A. SEIDLECK, *Examiner.*

E. M. WOODBERRY, J. NORRIS,
*Assistant Examiners.*

UNITED STATES PATENT OFFICE
CERTIFICATE OF CORRECTION

Patent No. 3,361,690                                January 2, 1968

Arthur S. Gregory et al.

It is hereby certified that error appears in the above numbered patent requiring correction and that the said Letters Patent should read as corrected below.

Column 1, line 50, for "kiln" read -- knit --; column 4, line 37, for "present" read -- prevent --; column 5, line 19, for "unsturated" read -- unsaturated --; line 24, for "conribute" read -- contribute --; line 50, for "composiition" read -- composition --; column 6, line 33, for "friction" read -- fraction --; column 7, line 6, for "have" read -- having --; columns 7 and 8, sub-headings to the table, for "$A^1$, 1, 3, 3, 4, 5" read -- $A^1$, 1, 2, 3, 4, 5 --; same table, fifth column, line 8 thereof, for "10 14/16" read -- 9 14/16 --; column 8, line 53, for "monmer" read -- monomer --; column 9, first table, third column, line 5 thereof, for "19.22" read -- 19-22 --.

Signed and sealed this 15th day of April 1969.

(SEAL)
Attest:

EDWARD M. FLETCHER, JR.                    EDWARD J. BRENNER
Attesting Officer                            Commissioner of Patents